J. H. SAGER.
BUMPER.
APPLICATION FILED OCT. 30, 1916.
1,296,855.
Patented Mar. 11, 1919.
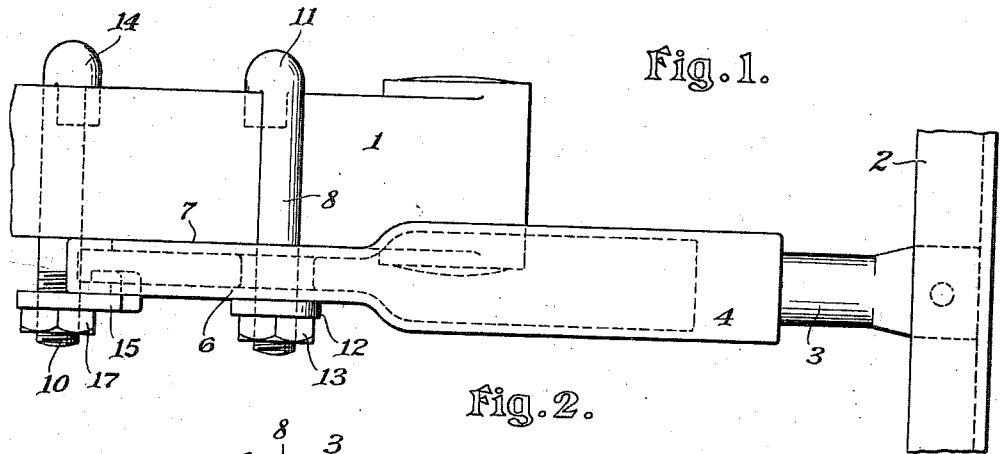
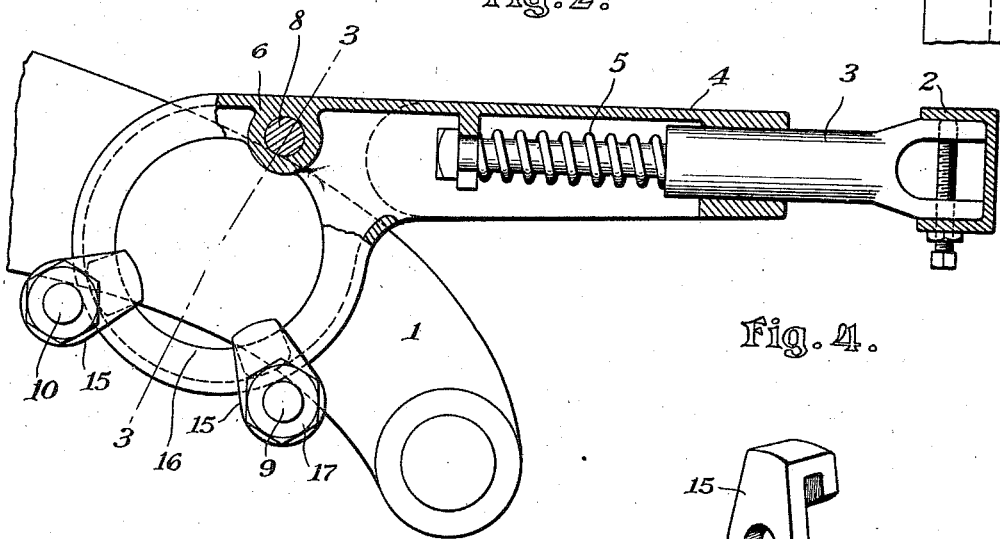
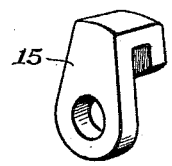
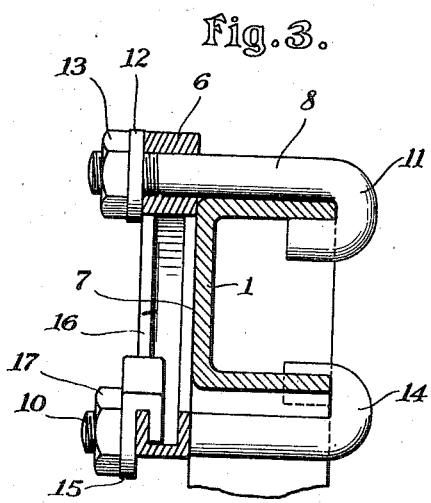
Inventor:
James H. Sager
by Davis & Simms
his attorneys

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

BUMPER.

1,296,855.

Specification of Letters Patent.  Patented Mar. 11, 1919.

Aplication filed October 30, 1916. Serial No. 128,409.

*To all whom it may concern:*

Be it known that I, JAMES H. SAGER, a citizen of the United States, and resident of Rochester, in the county of Monroe and State of New York, have invented certain new and useful Improvements in Bumpers, of which the following is a specification.

The present invention relates to bumpers and more particularly to the supporting arms thereof, an object of the invention being to provide a construction which may be clamped to the vertical side faces of the longitudinal frame bars while at the same time, permitting the arms to lie in a horizontal position on bars of different vehicles, notwithstanding the different curvatures of such bars. Another object of the invention is to utilize the fastening means as the pivot on which the supporting arm swings to secure a horizontal position, thus doing away with the usual pivot block between the arm and the fastening means. A still further object of the invention is to provide a construction in which the strains or shocks produce a compression of the vehicle frame bar in a transverse direction so as to practically eliminate stresses in the direction of the length of the vehicle frame bar.

To these and other ends, the invention consists of certain parts and combinations of parts, all of which will be hereinafter described, the novel features being pointed out in the appended claims.

In the drawings:—

Figure 1 is a plan view of one of the supporting arms of a bumper attached to the forward end of a vehicle frame bar;

Fig. 2 is a side view, partially in section, showing one of the supporting arms attached to a vehicle frame bar;

Fig. 3 is a section on the line 3—3, Fig. 2; and

Fig. 4 is a perspective view of one of the hooked washers.

The bumper may comprise an impact element 2 carried by two arms, each of which is secured to one of the vehicle frame bars 1. In this instance each arm is formed of two members 3 and 4 slidably connected together and having a spring 5 interposed between them. The rear end of each arm may have an enlarged portion 6 with a vertical face 7 lying parallel with the length of the arm and adapted for contact with a side face of the vehicle frame bar 1. In order to secure the arm to the frame bar, a fastening means is provided which is so connected to the supporting arm that the latter may be caused to assume a horizontal position notwithstanding the shape or curvature of the forward end of the frame bar and this without the provision of a separate block on which the arm is pivoted.

The fastening means in the present embodiment comprises a plurality of devices preferably in the form of bolts 8, 9 and 10 having hooked ends. The bolt 8 passes through an opening in the supporting arm and is adapted to turn in said arm, the hooked end 11 thereof engaging the upper flange of the vehicle frame bar while the other end thereof carries a washer 12 and a nut 13. The other hooked devices 9 and 10 are preferably connected to the supporting arm in such a manner that they may shift relatively thereto. Each of these devices has the hooked portion 14 thereof engaging the lower flange of the supporting frame while at their other ends are carried hooked washers 15 which are adapted to engage about an overhanging curved flange 16 on the enlarged end of the supporting arm. Nuts 17 are also provided on the hooked devices 9 and 10.

In attaching the bumper to the vehicle frame, the three hooked devices 8, 9 and 10 are engaged with the vehicle frame bar 1 so that the device 8 lies on one side of the bar while the devices 9 and 10 lie on the other side of the bar. Before the nuts of these devices are tightened, the supporting arm of the bumper is shifted on the device 8 as a pivot until the arm is horizontally arranged, after which the nut 13 is tightened and the devices 9 and 10 are shifted in opposite directions until they engage firmly with the under sides of the vehicle frame bars after which their nuts are tightened. This brings the vertical face 7 of each supporting arm in firm contact with the inner side face of its corresponding vehicle frame bar, thus holding the bumper in its adjusted position. A blow on the impact bar 2 causes the strains to be transmitted to the bolts 8, 9 and 10, and as the arms have pivotal action on the bolts 8 depending on the direction of the impact, this produces transverse compression strains on the vehicle supporting bars, thus eliminating objectionable pressure in the direction of the length of the bars of the vehicle frame.

A bumper constructed in accordance with this invention permits the supporting arms to be maintained horizontally on different vehicle frames without the use of separate pivot blocks. The connections with the vehicle frame bars are such that the main compression due to impact is transferred to the vehicle frame bars in directions transversely of its length instead of longitudinally of said bars, thus eliminating strains on the frame of the machine that would tend to weaken such frame.

What I claim as my invention and desire to secure by Letters Patent is:

1. In combination with a vehicle frame bar having horizontal flanges presented inwardly, a bumper supporting arm arranged on the outer face of said frame bar, and fastening means for securing the bumper supporting arm to the frame bar comprising two hooked bolts, one of which engages the frame bar nearer the front end of the frame bar than the other and has the bumper supporting arm mounted thereon to turn about the bolt as an axis, and the other of said bolts being arranged in rear of the first named bolt, passing under the frame bar and engaging the lower flange of the frame bar, said last mentioned bolt being shiftable bodily on the supporting arm transversely of the length of the bolt in order to permit the proper positioning of the bumper supporting arm on the frame bar.

2. In combination with a vehicle frame bar, a bumper supporting arm engaging the side face of the frame bar, and fastening means therefor embodying two bolts lying transversely of the bar, one on the upper side and the other on the lower side, one of said bolts having the supporting arm mounted to turn thereon and the other of said bolts being mounted to shift bodily with reference to the supporting arm to connect with the latter at different points.

3. In combination with a vehicle frame bar, a bumper supporting arm having an upright surface at its inner end contacting with a side face of the bar, and fastening means for the bumper arm comprising two bolts having hooked portions for engaging the frame bar, said bolts lying transversely of the bar, one on the upper side and the other on the lower side, one of said bolts having the supporting arm mounted to turn thereon and the other of said bolts being mounted to shift bodily with reference to the supporting arm to connect with the latter at different points.

4. The combination with a vehicle frame bar, a bumper supporting arm having an enlarged end formed on a curve, and provided with a vertical flat face extending longitudinally of the arm and engaging with a side face of the frame bar, and fastening means embodying two hooked members, on one of which the enlarged end is mounted to turn and the other of which is adapted to coöperate with the frame bar and the curved portion at various points on said curved portion to hold the enlarged end in its adjusted position.

5. In combination with a vehicle frame bar, a bumper supporting arm abutting one side of said bar having an end with an overhanging curved flange, a hooked device on which said arm turns, lying on one side of the bar and a hooked device lying on the other side of the frame bar and having a hooked washer coöperating with the curved flange of the end of the arm.

6. In combination with a vehicle frame bar, a bumper supporting arm having an upright surface at its inner end contacting with a side face of the vehicle frame bar, and fastening means for drawing said face against the bar, said fastening means comprising three bolts, one of which lies on one side of the frame bar transversely of the latter and has the supporting arm mounted to turn thereon and the other two of which lie on the opposite side of the frame bar transversely thereof, and are shiftable bodily with reference to the supporting arm to secure the latter at different points.

JAMES H. SAGER.

Copies of this patent may be obtained for five cents each, by addressing the "Commissioner of Patents, Washington, D. C."